United States Patent Office 2,724,107
Patented Nov. 15, 1955

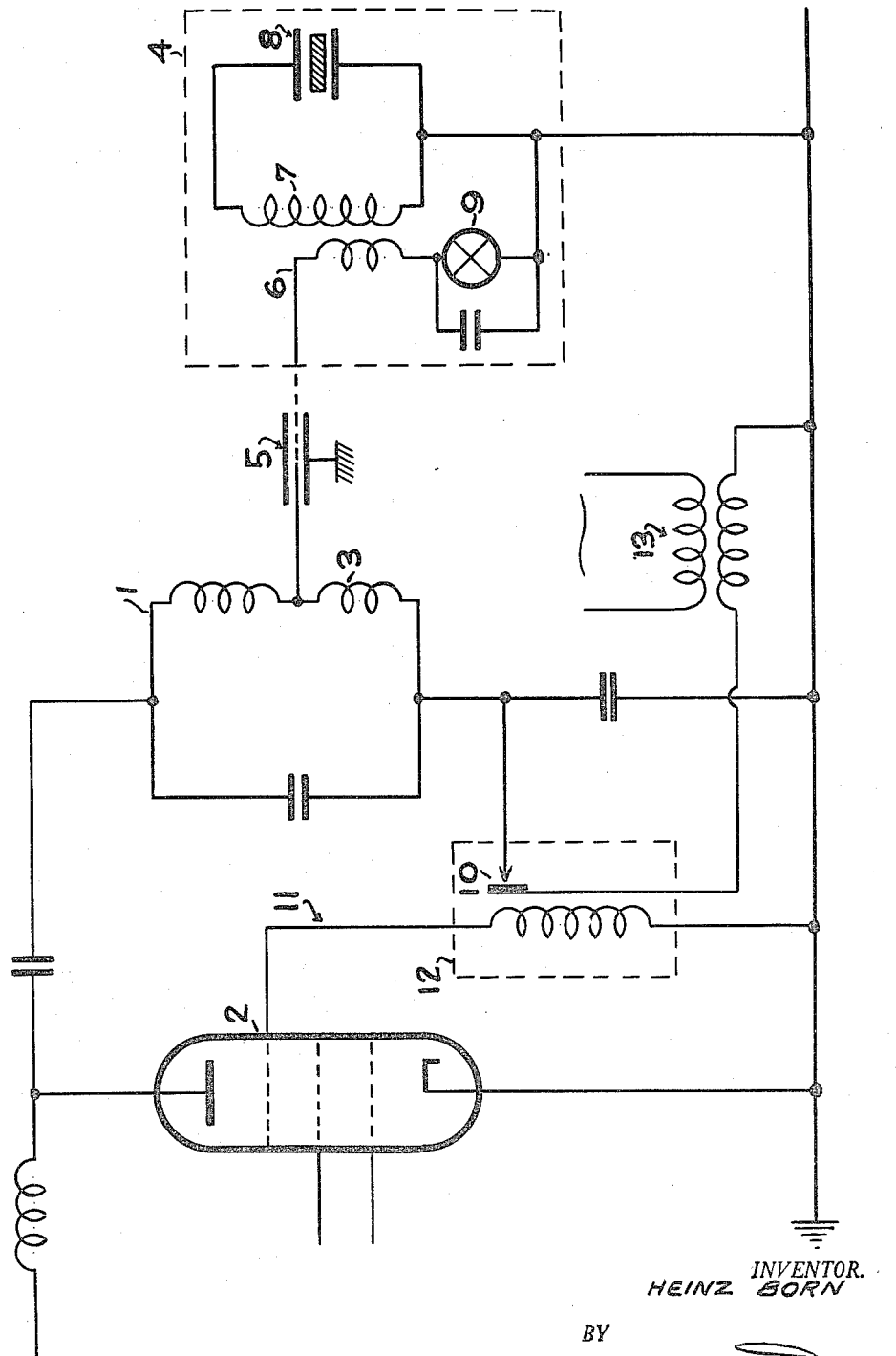

2,724,107

DEVICE FOR TRANSFER OF SUPERSONIC VIBRATIONS

Heinz Born, Frankfurt am Main, Germany, assignor to Ultraschall-Geratebau Dr. Born & Co., Frankfurt am Main, Germany, a corporation of Germany Application June 13, 1952, Serial No. 293,457

4 Claims. (Cl. 340—248)

This invention relates to an improved apparatus and system for conducting tests and operations on materials of various kinds with ultrasonic vibrations. More particularly, this invention relates to an improved signal indicating system for announcing faulty operation of the testing equipment.

It is a well known expedient in both the engineering and medical professions to use supersonic vibrations for agitating various physical substances and organs in order to induce a physical or physiological change, therein. It is a further common expedient in both such professions to use supersonic acoustics for exploratory investigation of various characteristics in the subject matter undergoing examination. In either case, it is important that the operator of the ultrasonic wave generating and indicating equipment be immediately advised of any faulty operating procedure in order that such may be immediately located and rectified so as to preclude the obtaining of erroneous data or the incurring of serious damage in the subject matter examined. This is particularly critical in the medical profession where the subject matter under observation or treatment is often a human being and where the physician generally must direct his full attention during the treatment or examination upon the correct guidance of the treating head and upon the patient, whereby he has little time to devote his attention to the operation of the ultrasonic apparatus or the measuring instruments.

It is therefore a prime purpose of the instant invention to obviate such difficulties and provide a direct, accessible and easily visible indicating means for continuously registering the operative or inoperative performance of the apparatus and procedure.

In practice such ultrasonic apparatus generally consists of an electrical ultrasonic wave generator connected to a transducer which in turn converts the electric oscillations into ultrasonic acoustic waves, and a receiving or measuring unit which is connected with the wave generator to the medium undergoing treatment or examination and which indicates the results or performance thereof by reconverting or abstracting energy from the acoustic waves induced in said medium. In such systems the wave generator and receiving unit each include transducers which are sharply tuned so that if dampening is added to any part of the system it tends to decrease the sharp tuning, eliminating resonance between such units. Further, the abstraction of intelligible information from such procedure normally depends upon the resonance effects in all parts of the system and is inherently difficult to control due to the fact that such resonance propagates standing or reflected waves which combine to form a resultant acoustic wave pattern which may vary the accuracy registered by the receiving unit. In practice the wave generator and receiving unit are tuned to compensate for such resonance effects and will accordingly register accurately unless there is a change in the acoustic impedance of the system which in turn varies the effect of the resonant tuning as noted above. This phenomenon commonly occurs as a difference in energy levels for separate standing waves as the medium undergoing tests is moved between the two transducers respectively.

A further problem which is encountered is the fact that the electric impedance of the circuit in the wave generator is influenced by the vibration of the transducer therein contained. Because of this vibration, a back E. M. F. is generated and reimpressed on the generating circuit. This back E. M. F. will act to oppose the impressed one and as a result changes the circuit impedance. This effect may also be obviated by proper tuning of the wave generator and receiving unit so that it does not impair the accuracy of the experimental data obtained.

However, the correct tuning of the wave generator and receiving unit to obviate the undesirable effects above noted must be frequently changed due to the fact that the acoustic impedance of the system is often varied by movement of the medium undergoing test or by movement of a portion of the wave generating system or the receiving unit. In any case this variance in spacial positioning in the parts of the system will change the acoustic impedance of the system and thereby the performance thereof, unless some kind of provision is made to immediately bring such condition to the attention of the operator of the apparatus.

Some prior art attempts have been made to obviate the above noted difficulties by loosely coupling the oscillator of the wave generator with the transducer therefor. In such case the standing wave resulting from the acoustic load is employed directly for indicating the performance of the energy transfer. This, however, has not proven successful as it requires continuous observation of the recorded data in the receiving unit in order to discern the almost imperceptible error induced by a change in the acoustic impedance of the system, and accordingly diverts attention from the subject matter or media undergoing examination or treatment.

In contrast thereto it is now proposed to employ a relay unit in the electrical network of the wave generating unit whereby such changes will be immediately indicated to the operator. It is further proposed that such indicating structure be incorporated directly with the transducing element which in the case of physiotherapy takes the form of a mobile "treating head" which may be changed in position over the body of the patient undergoing examination or treatment.

To accomplish this result a pentode tube is connected to operate as an oscillator-amplifier and is directly coupled via a coaxial cable or parallel two wire system to the transducing element incorporated in the "treating head." A tuning circuit is provided in series with the transducer and is adjusted so that changes in acoustic impedance within the system, which are in turn reflected to such transducer, are passed through an inductive coupling back to the tank circuit of the oscillator to thereby vary the plate impedance and voltage in the oscillator network. This factor in conjunction with the inherent characteristic of pentode tubes to form a virtual cathode at the suppressor grid upon a change in plate potential is utilized to initiate operation of an indicating mechanism in the "treating head".

This indicating means may take the form of a signal lamp positioned in the "treating head" itself and connected to emit light (through suitable water-proofed openings) upon a correct balance in the acoustic impedance and resonance of the system so that the physician may directly determine during the treatment whether he is operating correctly or not without having to divert his attention from the patient and treating technique. It will be understood, however, that the signal lamp may also consist of an acoustic signal or may include an additional lamp connected therewith and positioned in the casings of the apparatus tiself.

Reference will now be made to the drawings in describing a specific embodiment of the invention and in which the single figure is a circuit diagram illustrating the connections and elements of the invention.

As will be shown by an inspection of the figure, the wave generator includes a pentode 2 having its plate circuit directly connected in series with a resonant tuning unit 1, commonly denoted the tank circuit. A direct coupling is tapped from the winding 3 of the tank circuit and serially connects via an inductance coil 6 in circuit with a supersonic quartz crystal 8 which transduces the electrical energy derived from the tank circuit 1 of the oscillator into mechanical supersonic ultra high frequency vibrations. An indicating or signal lamp 9 is connected in series with the coil 6 and, via the common cathode return, ultimately to ground. A by-pass capacitor is provided around the signal lamp for obvious reasons. A second inductive coil is provided in series with the suppressor grid of the pentode 2 and is adapted to energize the normally closed contacts 10 of a relay unit 12 to an open position upon an incremental increase above a predetermined value in the voltage in the suppressor circuit. One contact of the relay 10 is directly connected in the plate circuit of the pentode 2, above an isolating capacitor, while the other contact thereof is serially connected with one winding of a sixty cycle (or other conventional low frequency source) current transformer 13 and thence through the common cathode return to ground.

It will thus be apparent that with contacts 10 of relay 12 normally closed, a continuous circuit is provided through such contacts, the winding 3 in the tank circuit 1, the lead 5, coil 6, signal lamp 9, and common cathode return through one winding of the transformer 13 back to the contacts 10. This closed circuit enables the low frequency transformer power source 13 to induce a low frequency current in said closed circuit so as to energize the signal lamp 9 and indicate a continuous and correctly operated procedure in the performance of the ultrasonic treatment or examination. Upon a change in the acoustic impedance within the system, in either the oscillator unit tube or the treating head 4, or the media under treatment or examination, or the receiving unit, previously described, the desired operating performance will be adversely affected and should be immediately corrected to avoid loss of time or damage.

From an inspection of the circuit diagram it will be readily appreciated that the high frequency oscillations initiated in the tank circuit 1 of the pentode 2 are transferred via the direct connection 5 and the inductive coupling 6 to the transducer 8 which converts such electrical energy into mechanical acoustic vibrations of an ultrasonic nature. It will further be apparent that upon a change in the acoustic impedance in any part of the system, as noted previously, such change will be reflected back through the coupling 6—7 and the lead 5 to the tank circuit 1, changing the potential of the plate circuit of the pentode 2. This change in plate potential results in a further change in potential distribution within the pentode 2, whereby the potential across the suppressor grid circuit 11 is increased. This causes a current to be drawn through the coil winding of the relay 12 to deenergize the normally closed contact 10 of such relay and to interrupt the continuity in the low frequency potential source from transformer 13, thus disrupting the operation of the signal lamp 9 which by its extinguishment indicates a change in operating characteristics in the performance of the supersonic treatment or examination.

One of the distinct advantages gained by the employment of the above circuit is the fact that the direct coupling link 5 between the tank circuit of the oscillator and the transducer 8 in the treating head may be either a concentric cable with screening or a two-artery cable grounded on one side which may be utilized to transmit the low frequency current necessary to energize the signal lamp 9. It will thus be seen that only a single conduit is necessary for conveying both the high frequency signals generated by the tank circuit 1 and the low frequency energizing potential provided by the alternating current source transformer 13. This innovation greatly facilitates the simplification of the construction of the unit and also reduces its cost of manufacture.

It will thus be apparent that the present invention provides a positive, easily accessible monitoring unit wherein changes in acoustic impedance, such as may occur from a change in the position of the treating head relative to the body of a patient under treatment, may be immediately indicated by deenergization of the signal lamp 9 in the treating head in a spacial position where its extinguishment cannot pass unnoticed by the operator of the apparatus. In practice suitable adjustment is made in the tank circuit 1 and the transducer circuit 7 such that "motional impedance" and deleterious resonant effects due to standing waves are eliminated. In such case the suppressor grid circuit 11 draws no current and the relay 12 remains deenergized with the contacts 10 in their normally closed position. However, upon a change in acoustic impedance which causes a change in the plate potential of the oscillator tube 2 which in turn initiates a current in the circuit 11 of the suppressor grid of the pentode 2, the coil of the relay mechanism 12 is energized to open the contacts 10 of the low frequency circuit control switch 10 to thereby deenergize the signal lamp 9.

The instant invention has application to other supersonic testing apparatus wherein "treating heads" are not utilized as such. One such example is in the agitation of various chemical substances and physical structures in a liquid medium. In such case the instant relay structure may be utilized to indicate various effects or characteristics due to a change induced in the oscillator potential because of variance in the acoustic impedance of the system which is reflected back to the wave generator.

It will further be apparent that the instant invention may be applied to a screen grid tube in lieu of a pentode 2 in which case the excess current drawn by the screen grid circuit, due to a change in impedance in the tank circuit or in the potential across the tube output circuit, will induce an increased current in the circuit of the grid which may be used to operate the signal indicator disclosed.

As many apparently widely different embodiments of this invention may be made without departing from the spirit and scope hereof, it will be understood that the invention is not limited to the specific embodiments hereof, except as defined in the appended claims.

What is claimed is:

1. A device for indicating changes in the acoustic impedance of an ultrasonic testing system comprising an oscillator tube, converting means for converting the electrical energy derived from said oscillator tube into mechanical supersonic ultra-high frequency vibrations, means electrically coupling said oscillator tube to said converting means, and including a tuning circuit in series with said converting means, said converting means including a transducer and an inductive coupling connecting said transducer to said tuning circuit, a signal means electrically connected to said inductive coupling, and a suppressor grid in said oscillator tube electrically connected to one contact of a normally closed relay which is connected in series with a low frequency current transformer, the other contact of said relay being connected in series with said tuning circuit, whereby a continuous circuit is normally provided from said current transformer through said closed relay to energize said signal means, but whereby when a current, provided by a change in oscillator plate impedance, is initiated through said relay to open the contacts thereof, said signal means is deenergized.

2. The device of claim 1 wherein said oscillator tube is a pentode.

3. The device of claim 1 wherein said tuning circuit is a tank circuit in series with the plate of the oscillator tube, said tank circuit comprising an inductance coil in series with said plate, a capacitor in parallel with said inductance coil and a tap connecting said inductance coil to said converting means.

4. The device of claim 1 wherein said signal means is a lamp.

References Cited in the file of this patent

UNITED STATES PATENTS

| | | |
|---|---|---|
| 2,460,789 | Thompson | Feb. 1, 1949 |
| 2,580,155 | Brannen | Dec. 25, 1951 |
| 2,605,333 | Job | July 29, 1952 |